United States Patent [19]

Heidt

[11] Patent Number: 4,458,332
[45] Date of Patent: Jul. 3, 1984

[54] METHOD OF EXECUTING AN ADDRESS-JUMP COMMAND IN A STORED-PROGRAM SEQUENTIAL-CONTROL SYSTEM FOR PROCESSING MACHINES, AND IN PARTICULAR FOR INDUSTRIAL SEWING MACHINES, AND SEQUENTIAL-CONTROL CIRCUITRY FOR THE PRACTICE OF THE METHOD

[75] Inventor: Alfred Heidt, Schwetzingen, Fed. Rep. of Germany

[73] Assignee: Frankl & Kirchner GMBH & Co KG Fabrik für Electromotoren und electrische Apparate, Schwetzingen, Fed. Rep. of Germany

[21] Appl. No.: 313,693

[22] Filed: Oct. 21, 1981

Related U.S. Application Data

[63] Continuation of Ser. No. 047,602, Jun. 11, 1979, abandoned.

[30] Foreign Application Priority Data

Jun. 24, 1978 [DE] Fed. Rep. of Germany ....... 2827808
Nov. 22, 1978 [DE] Fed. Rep. of Germany ....... 2850538

[51] Int. Cl.³ ............................................. G06F 9/32
[52] U.S. Cl. ................................................... 364/900
[58] Field of Search ... 364/200 MS File, 900 MS File, 364/136, 140

[56] References Cited

U.S. PATENT DOCUMENTS

| | | | |
|---|---|---|---|
| 3,793,631 | 2/1974 | Silverstein et al. | 364/200 |
| 4,058,850 | 11/1977 | Sheikh | 364/900 |
| 4,068,300 | 1/1978 | Bachman | 364/200 |
| 4,075,707 | 2/1978 | Wilmer | 364/900 |
| 4,115,853 | 9/1978 | Dummermuth | 364/900 |

Primary Examiner—Thomas M. Heckler
Attorney, Agent, or Firm—Felfe & Lynch

[57] ABSTRACT

In a method and circuit for executing an address jump command in a stored-program sequential-control system for operating machine tools or the like, an address counter is settable to a desired count and is able to count in a stepwise manner from any initial count therein and a program memory is provided which is connected to the output of the address counter and has data stored therein corresponding to each address which either is associated with the actuation of an output generator for the machine tools or the like or with the actuation of a jump command generator interrogation circuit. A first signal is generated when the data corresponding in an address is associated with the actuation of a jump command generator and the address counter is controlled when a jump command is present from the interrogated jump command generator to set the address counter to a new count which represents the jump address. This is carried out by detecting the presence of a jump command for generating a set signal, advancing the address counter to the next address in its sequence, and transferring the data associated in the program memory with this next address into the address counter by the set signal whereby the address counter receives this present jump address as its new count setting.

24 Claims, 3 Drawing Figures

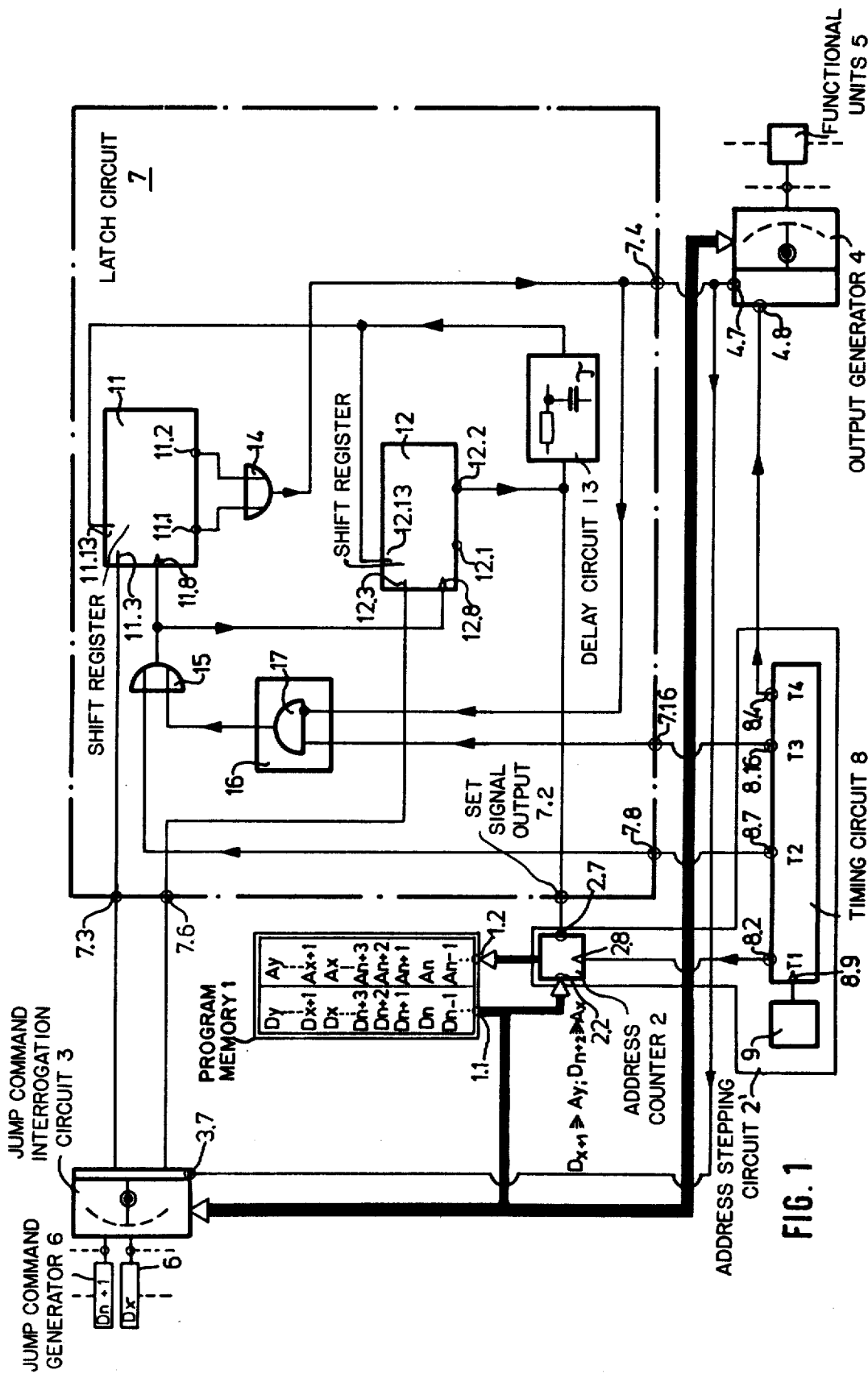

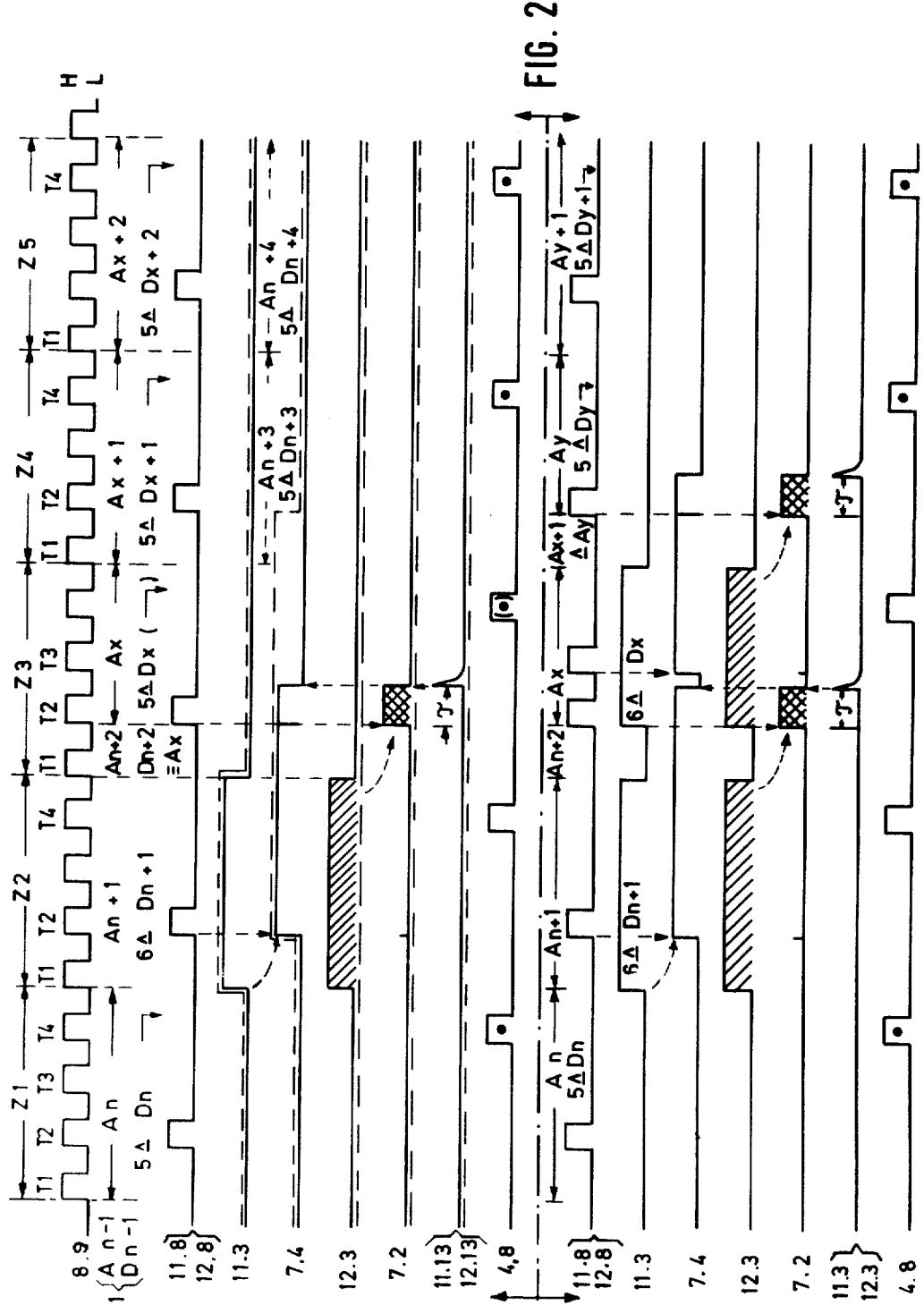

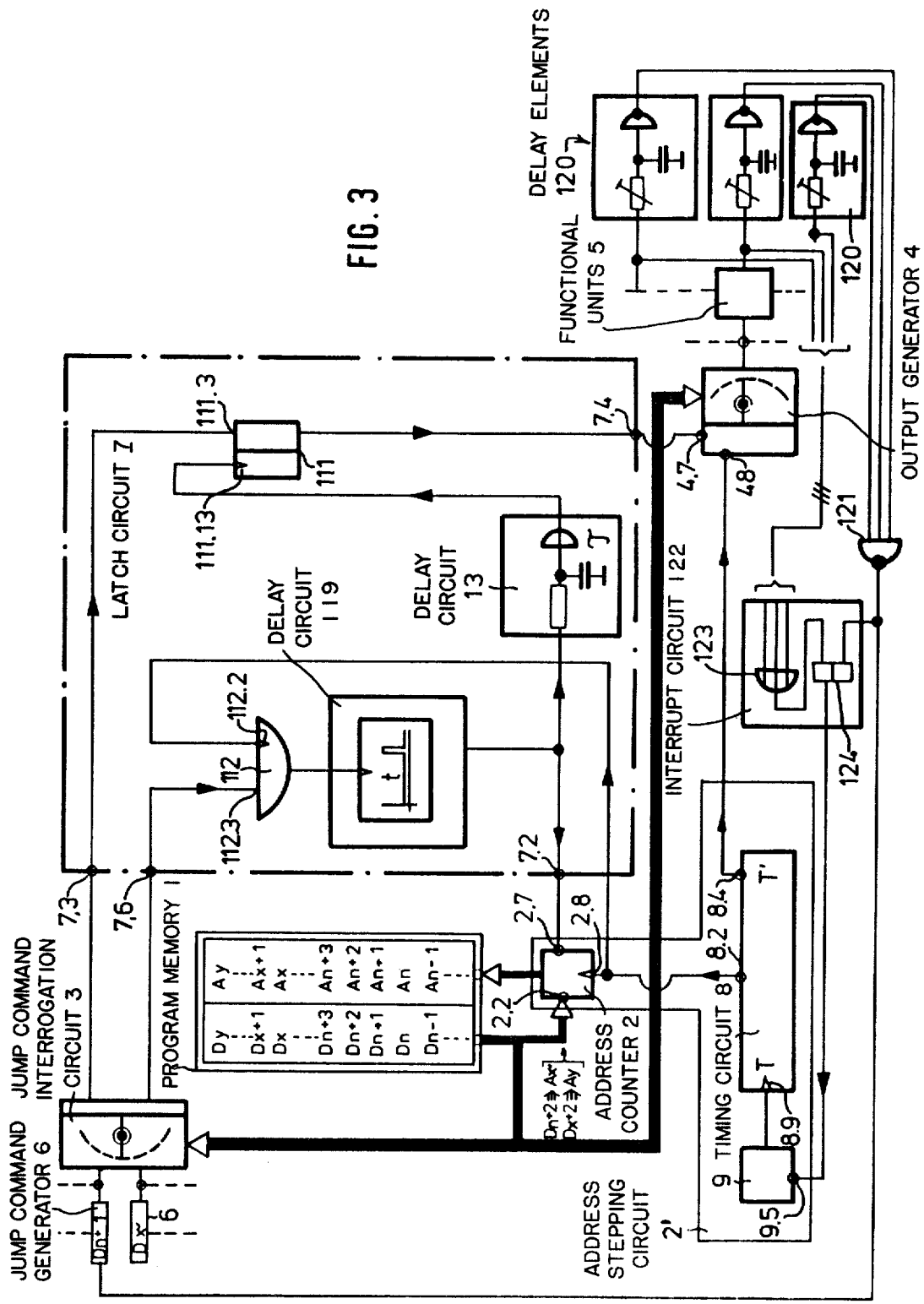

METHOD OF EXECUTING AN ADDRESS-JUMP COMMAND IN A STORED-PROGRAM SEQUENTIAL-CONTROL SYSTEM FOR PROCESSING MACHINES, AND IN PARTICULAR FOR INDUSTRIAL SEWING MACHINES, AND SEQUENTIAL-CONTROL CIRCUITRY FOR THE PRACTICE OF THE METHOD

This is a continuation of application Ser. No. 047,602, filed June 11, 1979, abandoned.

BACKGROUND OF THE INVENTION

The invention relates to a method of executing an address-jump command in a stored-program sequential-control system for processing machines, and in particular for industrial sewing machines, and sequential-control circuitry for the practice of the method.

A method and circuit of this kind are described in ELEKTRONIK, 1975, No. 1, pp. 53 to 58, especially in section 2. With a view to keeping the cost of the program memory down, the described method and circuitry are limited to dual jumps and work with a parallel-loadable address counter for accessing of the program memory. If no jump command is provided between two program steps or a possible jump command is not present, the address counter is advanced to the next counter position which corresponds to the next address and thus leads to the reading of the next data block in the program memory. But if a jump command is present, that is to say, if the next data block stored in the program memory is not to become effective, then one bit of the binary count of the address counter is inverted and thus an entirely different address in the program memory is read instead of the normal, stepwise sequence of counter positions. From there on the stepwise progression of counter positions continues until another jump command brings about a change in the binary representation of the count, and accordingly a jump into still another section of the overall counting range. Such a program-memory structure which permits program jumps to be made in the course of sequential-control program execution is referred to as "paging". This greatly increases the amount of storage required, because such intervention in the binary-coded address leads to entirely different memory regions which from the standpoint of program size should not be needed in the first place. Storage capacity of such size is necessarily poorly utilized. On the other hand, if the occupation of the available memory locations is to be optimized, then very hard-to-follow storage of the program must be tolerated; resulting malfunctions due to inadvertent double occupancy of memory locations are hard to analyze and can be corrected only by costly intervention in memory-location assignment.

SUMMARY OF THE INVENTION

By contrast thereto, the invention has as its object to modify a method and circuitry of the type outlined in such a way that stored-program sequential-control systems with address-jump commands may be implemented without an undue programming effort and without costly intermediate storage of data.

In accordance with the invention, this object is accomplished in a method of the present invention and, in the circuitry of the present invention.

The solution in accordance with the invention also permits simple implementation of elaborate circuit functions such as jump-command sequences in stored-program sequential-control systems. The memory organization, and hence programming, remain perfectly straightforward and therefore are readily checked or modified. Queues and forward and backward jumps may be specified at will just by storing jump-address numbers. Serial or parallel binary-coded data can energize a plurality of functional units and set timing-pulse generators. Wherever provision is made in the program under execution for a decision-based jump, there will be no outputting of data when the associated memory location is reached but rather an interrogation of a jump-command generator which is identified by the data stored at that address. If the jump-command generator delivers an input signal which calls for the execution of the address jump, the next memory location is interrogated for the jump address, the corresponding numerical value entered in the address counter (that is to say, the counter set for that value), and the successive interrogation of the contents of the memory continued with that jump address. Thus, the jump addresses may be any desired numbers within the range of numbers over which the addresses extend, and there is no need to depart from that range of numbers or to observe particular laws with regard to the numerical structure, as, for example, to reserve given memory locations for jump addresses, as is required with paging.

The invention thus reduces the programming effort to a consecutive list of numbers and the memory content at the various storage locations, this memory content being the number of a jump address when the preceding memory location is assigned, not to a data output, but to interrogation for the presence or absence of a jump command. The cycle time for the execution of an address jump or even of an address-jump sequence is very short in relation to the length of the individual successive timing periods even though a branch point has been reached because the information on which path is to be followed is stored at two successive memory locations.

Because of the simple sequence of operations and the modest programming requirements, inexpensive, slow read-only memories may be used. With regard to circuitry, all that is needed to implement the solution in accordance with the invention (other than the read-only program memory with multiplexer for interrogation of various jump-command generators and demultiplexer for energization of functional units, which are required in any stored-program control system) in essence is a timing-pulse generator circuit for generating distinguishable signals.

A distinguishable transfer signal between two stepping signals for progressing the address, possibly with the additional interposition of a latching signal, makes it possible to execute the address jump in two successive timing periods, without intermediate data or address storage, and in a manner which from the circuit-design standpoint is particularly simple and reliable.

One variant of the invention contemplates the use of successive latching signals between the stepping signal at the start of a timing period and the transfer signal at the end of a timing period. It offers the special advantage that successive jump commands may be executed in direct succession, without interposition of data timing pulses, without intermediate storage, and without any particular program features.

The special mode of implementation in accordance with another variant has the particular advantage that for the execution of one-step or multi-step address-jump commands no logic units need to be programmed separately as central control units. Rather, two two-stage shift registers, which are timed by the particular latching signal effective at the time, are needed. One of these inhibits any outputting of data when a memory position is reached which is assigned to a branch point. The other, after the memory steps to the next location at which the jump address is stored, triggers the acceptance of this numerical value as the new address-counter position when a jump is to be executed.

In still another variant, both an inhibit signal and a set signal are derived from a stepping signal when a jump command is present. This solution offers the advantage that the shift registers in the latching circuit and the address stepping means for producing between every stepping signal and transfer signal at least one latching signal for pulsing of the shift registers may be dispensed with. It is based on the realization that when a jump-command generator is interrogated, the jump-command generator interrogation circuit need not be inhibited. Instead the presence of a jump-command signal is used directly to prepare an AND circuit which is enabled, since that jump command is still present, at the leading edge of the next stepping signal. If the address counter is not designed to execute a counting step before the information made available at its transfer input is accepted, it is merely necessary to provide a short time delay in pulsing its transfer set input to assure that the transfer occurs only after stepping to the next, jump address having the data which is then taken by the address counter as the new counter position.

In principle, the end of the stepping signal may be used to trigger such delayed release of the set signal. However, care must then be taken to assure that the data block just reached (for selection of a jump-command generator) is not accepted as a jump address, that is to say, as the new address-counter position. Multiple use of a data block in such a way that it would serve not only for interrogation of a given jump-command generator but also for definition of the jump address (in the presence of a request for execution of an address jump) would result in an overly complex memory organization and poor memory utilization and would largely nullify the advantages of the invention through a correspondingly complex program structure. This is why in keeping with the invention it is preferable to release the set signal as a function of the start of a stepping signal. In this way, assurance is provided that when a jump-command generator is selected for the first time, the release of the set signal is not initiated, since no data from that jump-command generator can be present at the start of the stepping signal initiating such selection, but is initiated only upon the occurrence of the next stepping signal. The latter then causes stepping to the next memory location, at which the jump address itself is stored. Any desired number of address jumps can thus be sequentially executed directly, without requiring intermediate memory-accessing steps, and without need for temporary storage.

In the program memory, the data blocks at the various addresses which do not select any jump-command generator may either be jump addresses or assigned to functional units energized through an output generator. Further measures according to the present invention are designed to prevent malfunctioning of the functional units to be energized. Specifically, the output generator for energizing the functional units is inhibited when it is found (through selection of a jump-command generator from the memory) that the data block located at the next address in memory is a jump address and thus is not intended to energize a functional unit. The derivation of such an inhibit signal from selecting a jump-command generator is considerably simpler from the circuit-design and application standpoint than making allowance for corresponding data items in the memory.

The implementation of the control in accordance with the invention from simple circuitry also makes it possible to provide waiting times or stepping interruptions of any desired length in the program in a manner which is particularly advantageous from the standpoint of circuit design and programming. To this end, some specific functional units activate delay stages which follow them or are integrated with them. These are connected on the output side to given or memory-selectable jump-command generators or are used directly as such generators. Depending on whether the generation of further stepping signals is or is not interrupted for a delay time, either a jump command is ignored for the delay interval and executed only after that interval has elapsed and that jump-command generator is again interrogated, or the entire further execution of the sequential-control program is interrupted until the delay interval has elapsed.

Additional advantages and features of the invention are set forth in the claims and in the following description of embodiments of circuits in accordance with the invention for the practice of the method of the invention, which are represented in simplified form in the drawing.

BRIEF DESCRIPTION OF THE DRAWINGS

FIG. 1 is a schematic drawing of a circuit according to the invention involving the production of two successive latch signals between a stepping signal and a transfer signal;

FIG. 2 is a pulse diagram to explain the principle of operation of the circuit of FIG. 1; and FIG. 3 is a schematic drawing of a modified circuit of FIG. 1 which does not require the production of latch signals.

DETAILED DESCRIPTION OF THE INVENTION

Referring now to FIGS. 1 and 2, a program memory 1 contains a plurality of sequentially accessible locations which are identified by addresses A and are assigned to the information thus selectively accessible as binary-coded data D. In the preferred embodiment represented, the addresses A are given by numbers of a counting sequence. An address stepping circuit 2' accesses the individual storage locations in the memory 1 to read the data D contained therein. Which storage location is read is determined by the momentary state of an address counter 2 within the stepping circuit 2'. The individual storage locations identified by their addresses in the memory 1 are associated with specific operating settings of a jump command interrogation circuit 3 or an output generator 4, which are multiplexers (input ports) and demultiplexers (output ports), respectively. In the case where a storage location of memory 1 is associated with a particular operating setting of the output generator 4, the information at this storage location, i.e. a HIGH (H) or a LOW (L) binary data bit D, appears at the output of the output generator 4 associated with this operating setting to start or stop an electrically energizeable functional unit 5 such as for example a thread clipper in an industrial sewing machine. If H and L signals appearing sequentially or simultaneously in certain operating settings of the output generator 4 are evaluated together, they represent a more comprehensive binary-coded data item, such as for example information on the number of stitches to be made before a seam tie-off is to be made followed by the actuation of the thread clipper.

The performance of the devices connected to the output generator 4 thus depends on the data D at the sequentially occurring addresses A in the memory 1. Sometimes, however, the operational step which is called for under the next address A in the memory 1 is not wanted, and what is desired is a jump to an entirely different instruction at a different address, for example, a return for the repetition of an operational step. If such a departure from the stored address sequence of operations of the machine to be controlled is desired, a jump-command signal is delivered by a jump command generator 6 to the interrogation circuit 3 in the currently reached operating setting.

To execute such a jump to an address other than the next address in the memory 1, a latch circuit 7 is actuated by the generator interrogation circuit 3. The latch circuit then pulses the address counter 2 and the output generator 4.

The program memory 1 may be any kind of read-only memory and preferably is an integrated-circuit ROM or (for small production runs or for sequence controls subject to modifications) PROM. The address counter 2 preceding its address input 1.2 is a digital counting circuit of any type of coding (for example, a binary counter or a binary-coded decimal counter). It is only necessary that the address counter 2 gives counts whereby specific addresses A can be accessed in the memory 1; in other words, that the data D stored at these addresses A can be transferred to the output generator 4 or, if indicated, to the generator interrogation circuit 3. The address counter 2 is periodically pulsed through its counting signal input 2.8 by stepping output 8.2 of a timing circuit 8 in the stepping means 2' so as to count step-by-step, that is, to advance from accessing a storage location in the memory 1 to the storage location with the next address A. If, however, it is not the storage location with the next address A that is to be accessed (interrogated) but rather a storage location having an entirely different address A corresponding to an entirely different (higher or lower) address in count counter 2, this count must be made available in appropriately coded form at the acceptance input 2.2 of the address counter 2 along with a present or accept signal at the transfer input 2.7 of the address counter 2, as is known in the digital counting art. Until the appearance of another acceptance signal at the transfer input 2.7, further counting then takes place stepwise with pulsing of the counting signal input 2.8.

The timing circuit 8 in the stepping means 2' delivers between every two successive stepping signals T1 at its stepping output 8.2 a transfer signal T4 to an enabling output 8.4, and between the two, (at least) one latch signal T2 to a latching output 8.7. For this purpose, the timing circuit 8 is constructed as a feedback shift register (ring counter) which is pulsed by a pulse generator 9 through its timing input 8.9.

The latching circuit 7 allows or suppresses a jump to a jump address Ax instead of stepping on to the next A address in the sequence depending on the information from the jump-command generator 6. It consists essentially of two shift registers 11 and 12 having timing inputs 11.8 and 12.8, respectively, are connected through a latching input 7.8 of the latching circuit 7 to the latching output 8.7 of timing circuit 8 in the stepping means 2'; i.e., the latching signal T2 for activation of the latching circuit 7, which appears after each stepping signal T1 to advance the address counter 2, acts as a shift timing signal for the shift registers 11 and 12. The information input 11.3 of register 11 is connected through a latching circuit input 7.3 to the generator interrogation circuit 3, from which it receives an acknowledge signal whenever any jump-command generator 6 is pulsed by the memory 1 for information. The jump-command information itself is applied through the generator interrogation circuit 3 to a jump-command input 12.3 of the second shift register to which it is connected. The clear inputs 11.13 and 12.13 of the shift registers 11 and 12, respectively, follow a delay circuit 13. In the preferred embodiment shown, both shift registers 11 and 12 are two-stage registers. The second output 12.2 of the second shift register 12 pulses the delay circuit 13 and as a set signal, through a set output 7.2 of the latching circuit 7, the transfer input 2.7 of the address counter 2. The first output 12.1 of the second shift register 12 is not used. The two outputs 11.1 and 11.2 of the first shift register 11 are combined through an OR gate 14 and fed to an inhibit output 7.4 of the latching circuit 7.

An OR gate 15 ahead of the timing input 11.8 of the first shift register 11 receives at least one additional latch signal T3 from latching output 8.16 between a stepping signal T1 and the following transfer signal T4, in addition to the previously mentioned latching signal T2. The functional significance of latching signal T3 is explained in connection with FIG. 2. The latching circuit 7 has a second latching input 7.16 for this second latching signal T3, which is applied to the second input of the OR gate 15 through an inhibit stage 16. The inhibit stage 16 is in the form, for example, of an AND gate 17 having a negated input which is connected to the inhibit output 7.4 of the latching circuit 7 and thus releases the inhibit stage 16 whenever the inhibit output 7.4 is not enabled by either of the two outputs 11.1 or 11.2 of the first shift register 11.

Whenever a storage location in the memory is accessed by the address counter 2 and the data D of that location switch the generator interrogation circuit 3 to a particular jump-command generator 6, the interrogation circuit 3 enables the latch inhibit output 7.4 through the first shift register 11. This inhibits any change in the interrogation circuit 3 and any output of data in the output generator 4. For this purpose an inhibit input 4.7 of the output generator 4 and an inhibit input 3.7 of the interrogation circuit 3 are connected to the inhibit output 7.4 of the latching circuit 7. If the inhibit input 4.7 of the generator 4 were not enabled, the generator 4 would respond to the data D just reached in the memory 1 when the transfer signal T4 from the enabling output 8.4 of the timing circuit 8 releases a read-out control input 4.8 at the output generator 4.

These functional relationships are apparent also from the pulse-time diagram of FIG. 2 of which at first only the upper half will be considered. For simplicity, the output signals of the timing circuit 8 as well as the jump-command signals delivered by the jump-command generator 6 are represented as square-wave pulses. Other pulse shapes or pulsecode signals, however, may be used just as well in the practice of the method of the invention. At the timing input 8.9 of the timing circuit 8 there appears a pulse sequence from the pulse generator 9 which may be represented as a series of timing periods Z. Each timing period Z begins with a stepping signal T1 and ends with a transfer signal T4 between which (at least) one latching signal T2 appears. In the preferred embodiment represented, an additional latching signal T3 is provided within each timing period Z, the importance of which will be discussed in connection with the bottom half of the diagram of FIG. 2.

The appearance of a stepping signal T1 progresses the counter 2 and memory 1 from an address An-1 to the next address An to progress the data output 1.1 correspondingly from data Dn-1 to data Dn. The transfer signal T4 of the presently considered timing period Z1 then enables the read-out control input 4.8 of the output generator 4, which energizes the functional unit 5 connected to the output of generator 4 that is identified by the information Dn stored in memory 1.

At the beginning of the next timing period Z2 in FIG. 2, i.e., upon the appearance of the next stepping signal T1, the address counter 2 advances to the storage location having the next address An+1 in which the data Dn+1 are contained. These data Dn+1, let us say, are not associated with any functional unit connected to the output of the output generator 4 but with one of several jump-command generators 6 through the interrogation circuit 3. As a result of a jump-command generator having been pulsed through the data output 1.1 for jump-command information, a HIGH signal is delivered to the latching circuit input 7.3 by the interrogation circuit 3 as an interrogate-acknowledgment signal.

The latching signal T2 following the stepping signal T1 of the currently considered timing period Z2 serves at the timing input 11.8 of the first shift register 11 as a shift timing signal, i.e., it feeds the HIGH acknowledge signal at the information input 11.3 to the first output 11.1 of register 11 and thus to the inhibit output 7.4 of the latching circuit 7. Through the inhibit input 3.7 assurance is thus provided that for the time being no switch over of the interrogation circuit 3 to another jump-command generator 6. Through the inhibit input 4.7, this also prevents the appearance of the transfer signal T4 at the end of the timing period Z2 now being considered at the read-out control input 4.8 from causing the output generator 4 to energize any by the functional units 5. This is symbolized at the end of the upper half of Fig. of the omission of a dot.

With the next stepping signal T1, i.e., at the beginning of the next timing period Z3, the memory 1 advances to the next storage location with the address An+2. At this address, as data Dn+2, there is stored a jump address Ax at which the step-by-step readout of the content of memory 1 is to be continued, in lieu of stepping to the next storage location An+3, if in the preceding timing period Z2 the jump-command generator 6 assigned to the data Dn+1 commands a jump. This jump command to the information input 12.3 of the second shift register 12 is represented in FIG. 2 by shading. The latching signal T2, which appeared at the timing input 12.8 during timing period Z2 previously set a HIGH signal to the first but non-utilized output 12.1 of register 12.

In the timing period Z3, latching signal T2 shifts the HIGH signal in the first shift register 11 from the first output 11.1 to the second output 11.2. Since these outputs 11.1 and 11.2 are connected through the OR gate 14, the inhibit output 7.4 of the latch circuit initially continues to be enabled. This latching signal T2 in timing period Z3 also shifts the HIGH signal from the first output 12.1 of register 12 to the second output 12.2. This sends an enabling pulse (cross-hatched) to output 7.2 of the latching circuit 7. Now this enables the transfer input 2.7 of the address counter 2 which therefore is changed over to the numerical value Dn+2 corresponding to jump address Ax which has been appearing at the memory data output 1.1 and connected accept input 22 to the counter 2 since the beginning of this timing period Z3 and thus is present at the accept input 2.2 for the setting of the address counter 2 to the new count (jump address Ax).

The jump command therefore is executed in timing period Z3. The latching signal T2 in timing period Z3, however, also initiates interrogation of storage location Ax for the data Dx.

The appearance of the HIGH signal at the second output 12.2 of the second shift register 12 activates the delay stage 13. The delay stage is simply an R-C circuit but may also be an analog or digital delay line. After a time delay τ, the delay stage output sends a clear signal to the clear inputs 11.13 and 12.13 of the shift registers 11 and 12 whih sets all shift-register outputs 11.1 and 11.2 as well as 12.1 and 12.2 to LOW. This ends the pulsing of the inhibit output 7.4. The delay stage 13 is designed so that time delay τ ends, that is, the clear signal appears at its output, before the next signal T4 appears in the course of the timing period. Thus, the occurrence of the transfer signal T4 ending the current timing period Z3 enables the read-out control input 4.8 so that the output generator 4 can respond to the data Dx now present at the data output 1.1 as a result of the jump executed by energizing the functional unit 5 it identifies. Since in the present example corresponding to the upper half of FIG. 2 the data Dx read after the execution of the jump are not associated with an interrogation of a jump-command generator 6, the further reading of the data D stored in the memory 1 takes place step by step from address Ax. Thus, the next stepping signal T1 at the beginning of the next timing period Z4 progresses counter 2 and memory 1 to the next address Ax+1 to provide the data Dx+1 stored at it to energize the a functional unit 5 associated with the data when the readout control input 4.8 is pulsed by the transfer signal T4 at the end of this timing period Z4. The latching signal T2 occurring between stepping signal T1 and transfer signal T4 in this timing period Z4 does not pulse the latching output 7.4 because, in the absence of an interrogation signal to a jump-command generator 6 during this timing period Z4, no HIGH signals appear at the shift-register data inputs 11.3 and 12.3.

The next stepping signal T1 begins the next time period Z5 and advances the counter 2 and memory 1 to the next storage location at the address Ax+2 with the data Dx+2. The data is read out upon the appearance of the transfer signal T4 at the end of the timing period to energize the corresponding functional unit 5.

In the upper half of FIG. 2, the broken lines indicate the signal states that are established is the jump-command generator 6 had no jump command in timing period Z2. No address jump is then to be executed and instead an advance is to be made to the regularly following storage location in the memory 1. The signal acknowledging interrogation of a jump-command generator 6 appears at register input 11.3 as before. The latching signal T2 then transfers the HIGH signal to the first shift-register output 11.1 which again results in pulsing the inhibit output 7.4. However, since no instruction "Execute jump to jump address" is given by the jump command generator 6, no HIGH signal appears at the information input 12.3 of the second shift register 12, and its output 12.2 therefore remains at LOW. The set output 7.2 and of the delay stage 13 thus are not enabled. As in the previously considered case, the occurrence of the transfer signal T4 at the end of the timing period Z2 has no effect because of the actuation of the inhibit output 7.4 and the beginning of the next timing period Z3 advances the storage location to address An+2 which contains the jump address Ax as data Dn+2. This data, however, is not accepted into the address counter 2 because the set output 7.2 has not been pulsed.

Instead, the stepping signal T1 at the beginning of the next timing period Z4 causes the advance to the next storage location at address An+3 with data Dn+3 associated with a functional unit 5. The latching signal T2 which now occurs pulses the first shift-register timing input 11.8 to shift timing the HIGH signal out of the second output 11.2. Since a LOW signal was moved to the information input 11.3 in timing period Z2, a LOW signal now also appears at the inhibit output 7.4 when the transfer signal T4 appears at the end of this timing period Z4, the data Dn+3 can thus be read out by the memory data output 1.1 in order that the associated functional unit may be energized.

At the beginning of the next timing period Z5, the next storage location with the address An+4 is accessed in order to read out the data Dn+4 stored there for energization of the functional unit 5 upon the appearance of the transfer signal T4 in this timing period Z5.

It is evident, therefore, that the appearance of the latching signals T2 of two successive timing periods Z2 and Z3 in the presence of a jump command serves first to inhibit the interrogation and output units and then for a changeover to the jump address Ax within the same timing period Z3 in which that jump address itself appears as data Dn+2 at the data output 1.1. If, however, no jump command is present when a jump command generator 6 is interrogated, the existence of the jump-command address Ax is disregarded and there is an advance to the storage location having the address An+3 which regularly follows the one just reached, whereupon the actuation of the inhibit output 7.4 is cancelled.

Especially in the case of sequential controls it may happen that two or more decision criteria are present in a row; in other words, that upon a first execution of the jump command an address is reached at which data are stored which again trigger the interrogation of a jump command generator. In FIG. 2, this would mean that after passing to the jump address Ax in the timing period Z3, data Dx would appear at the data output 1.1 that are associated, not with the energization of a functional unit 5, but with another pulsing of a jump-command generator 6. The content of the data Dx+1 of the next address Ax+1 would then be another jump address Ay, i.e., a functionally identical timing period Z4 would follow the timing period Z3.

In accordance with the variant of the invention which provides for two successive latching signals T2 and T3 between a stepping signal T1 and a transfer signal T4, the processing time for the handling of such a series of two jump addresses is appreciably shortened. This is apparent in detail from the lower half of FIG. 2 for the case wherein a jump command is twice found to be present when a jump-command generator 6 is interrogated.

The additional latching signal T3 causes no change in the first timing period Z1 from that considered above. Since no HIGH signals are present at the information inputs 11.3 and 12.3 of the two shift registers 11 and 12, the additional shift timing signal at the timing inputs 11.8 and 12.8 from latching signal T3 will not change the output states of registers 11, 12. This is essentially true also of the timing period Z2, because before the appearance of the further latching signal T3, the inhibit output 7.4, and hence of the inhibit circuit 16, were already activated; in other words, the AND gate 17 for passing the additional latching signal T3 to the shift-register timing inputs 11.8 and 12.8 cannot be enabled.

Let us now say that the data Dx at the jump address Ax which is assumed during the time period Z3 are not associated with a functional unit 5 but again with the pulsing of the generator interrogate circuit 3 with respect to a given jump-command generator 6. In other words, at the information input 11.3 of the first shift register 11 there again appears a HIGH signal, namely, the acknowledge signal, due to the fact that a jump-command generator 6 is being pulsed. Assuming that this jump-command generator 6 is delivering the command for execution of an additional address jump, a HIGH signal will again appear at the information input 12.3 of the second shift register 12 before the first jump address Ax is reached. This is represented in the lower part of FIG. 2 as a second shaded jump command. Since the inhibit output 7.4 is no longer being enabled when an output signal appears at the delay stage 13, the AND gate 17 at the negated input is enabled, and the inhibit circuit 16 now passes the additional latching signal T3 within the timing period Z3. Through the OR gate 15, the timing inputs 11.8 and 12.8 are thus again pulsed so that the HIGH signals are transferred from the information inputs 11.3 and 12.3 to the first shift-register outputs 11.1 and 12.1. This results in another enabling of the inhibit output 7.4 on the basis of this additional latch signal T3.

Passing on to the next timing period Z4, the data Dx+1 at the address Ax+1 which represent the additional jump address Ay are read. The appearance of the first latching signal T2 of this timing period Z4 again advances the HIGH signal to the second output 12.2 of the second shift register 12 to again pulse the set output 7.2 for setting the address counter 2 to the new jump address Ay. Shortly thereafter and before another signal appears in the timing period Z4, the delay circuit 13 again delivers the clear signal for the resetting of the shift register outputs 11.1, 11.2 and 12.1, 12.2 to the LOW condition.

Thus this second jump is also executed, and a functional unit 5 is energized on the basis of the data Dy at this second jump address Ay now reached when the transfer signal T4 ending period Z4 activates the read-out control input 4.8.

In the next timing period Z5, an advance to the next storage location in the memory 1 takes place, in the manner already described, in which location additional data Dy+1 are contained at the address Ay+1 for the further energization of a functional unit 5.

Providing a second latching signal T3 thus prepares the second shift register 12 during the same timing period Z in which a jump to the jump address is executed by the advancement of the address counter 2 for the next address jump, which then is executed in the next timing period Z. Depending on whether the data in the storage location to which the jump has been made produce the energization of a functional unit or the interrogation of another jump-command generator, data are outputted in this timing period through the output generator 4 or the second shift register 12 set up for execution of still another address jump that may be required by the jump-command generator 6.

As a result of the described pulsing of two two-stage shift registers 11, 12 by two successive latching signals T2 and T3 between a stepping signal T1 and the associated transfer signal T4, it is therefore possible without a special programming effort to make two decisions (jump commands) followed by output information within only three timing periods Z. For this execution of any desired jump commands, surprisingly little circuitry is required, and the circuit arrangement therefore is trouble-free in operation. Market surveys have shown that a mere 50% of the commercially available systems for the assembly of stored-program controls permit the execution of jump commands, which seems to be explained by the fact that even when microprocessors are used in stored-program controls systems the cost of the additional circuitry required to achieve flexibility for execution of program jumps is very high. The drawbacks of having to modify the binary-coded address representation and setting storage space aside for executing program jumps have been discussed at the outset. By means of the method and circuitry of the invention, however, it is possible without great additional expense to equip even existing stored-program control systems and those still on the drawing board for the execution of conditional or unconditional program jumps, simply by adding to the existing circuiry the above-described shift-register circuit and the above-described modification of the timing-pulse generator for production of the quaternary timing.

In FIG. 3 the timing circuit 8 when pulsed by the pulse generator 9 delivers a stepping signal T at the stepping output 8.2 and a time-shifted transfer signal T' at the enable output 8.4. The appearance of a stepping signal T at the counting signal input 2.8 of the address counter 2 results in its advancement by one counting step. The immediately following appearance of a transfer signal T' at the readout control input 4.8 results in the energization of a functional unit 5 through an output generator 4 on the basis of the data block D which is assigned in the memory 1 to the address A corresponding to the count that has just been reached, provided that the readout inhibit input 4.7 which overrides the readout control input 4.8 is not simultaneously enabled by the latching circuit 7.

When the address counter 2 of the stepping means 2' reaches an address An+1 in the memory 1 having a data block Dn+1 which pulses a jump-command generator 6 through a generator interrogation circuit 3, the interrogation circuit 3 delivers an interrogate-acknowledge signal to an acknowledge generator input 7.3 of the latching circuit 7. This causes an inhibit flip-flop 111 to be set so that an inhibit output 7.4 following it delivers an inhibit signal to the inhibit input 4.7 of the output generator 4. This assures that when the memory 1 is transferred to the next address An+2 with Dn+2 which is a jump address Ax and not for energization of a functional unit 5, the output generator 4 is inhibited.

In order to accept this data block Dn+2 with jump address Ax into the address counter 2 through the accept input 2.2 as the new counter setting if the generator interrogate circuit 3 delivers a jump-command to input 7.6 of the latching circuit 7, a set signal must be produced at the set output 7.2 of the latching circuit 7 in the next operating cycle of the timing circuit 8. For this, the latching circuit 7 has an AND gate 112 with an information preparation input 112.3 connected to the jump-command input 7.6. Thus the AND gate 112 is enabled if and for as long as a jump-command generator 6 is addressed in the program memory 1 and indicates execution of an address jump.

The next stepping signal T initiating the next operating cycle of the timing circuit 8 advances the program memory 1 to the next address An+2 and triggers the AND circuit 112 through a dynamic enable input 112.2 to pulse a delay circuit 119 having a threshold element. At the end of the time delay, delay circuit 119 pulses the transfer set input 2.7 of the address counter 2 through the set output 7.2 to accept as a new count the jump address Ax=Dn+2, which is stored at the memory address An+2 that has just been reached. Simultaneously, this set signal also pulses a delay circuit 13 which, as represented in the drawing, consists, for example, of a gated R-C circuit for the production of a steep pulse edge output signal. At the end of the time delay, the address jump has already been executed by the acceptance of the jump address as a new count in the address counter 2, and the interrogate-acknowledge signal at the set input 111.3 of the inhibit flip-flop 111 thus has vanished. At the end of the time delay, the momentary pulsing of the reset input 111.13 of the inhibit flip-flop 111 cancels the inhibit signal at the inhibit output 7.4. When the transfer signal T' then appears at its enable output 8.4 in the same operating cycle, pulsing of the readout control input 4.8 of output generator 4 energizes the functional units of the data block Dx assigned to the jump address Ax.

Pulsing the reset input 111.13 of the inhibit flip-flop 111 has no effect if the address jump was to an address Ax with a data block Dx for the interrogation of an additional jump command generator 6. This is so because the interrogate-acknowledge signal at the acknowledge generator input 7.3 and the set input 111.3 overrides the delayed reset input 111.13 from the executed address jump. The output output generator 4 thus continues to be inhibited through its inhibit input 4.7.

Instead of the energization of a functional unit 5 in this case, the next stepping signal T at the beginning of the next operating cycle of the timing circuit 8 first causes an advance to the next address Ax+1. Stored at the latter is the additional jump address Ay in the form of the data block Dx+1. As a result of the additional jump-command, the AND circuit 112 is enabled to trigger a set signal from the delay circuit 119. After a delay in time, that is, when the data block Dx+1 is already present at the accept input 2.2 of the address counter 2, the set signal is delivered through the set output 7.2 to the transfer set input 2.7 and the additional address jump is executed as just described.

However, when the data block Dy assigned to this additional jump address does not again have the interrogation of a jump-command generator 6 as its content but rather signals the energization of a functional unit through an output generator 4, the inhibit flip-flop 111 is reset through the delay stage 13 to cancel the inhibit signal at the inhibit input 4.7, before the transfer signal T' appears within the cycle being performed. The appearance of the transfer signal T' then puts out the data block Dy at the new jump address Ay.

The circuit arrangement of FIG. 3 also implements simple or interdependent interruption or waiting periods in the course of execution of a sequential-control program. In accordance with the embodiment represented, differently dimensioned delay elements 120 are connected to respective functional units 5. Each consists, for example, of an R-C integrating network followed by a threshold circuit for production of a steep pulse edge, and they are combined through a NAND gate 121. This may itself form a jump-command generator 6 or may precede a jump-command generator 6 adapted to the interrogation circuit 3, as shown, which is pulsed and interrogated when the address An+1 in the memory 1 is reached.

When this address An+1 is reached, the generator interrogation circuit 3 will not deliver the jump-command signal to input 7.6 until after the preset interval of time following energization of the functional unit 5. Upon the appearance of the next stepping signal T, the advance to the next address An+2 occurs, as described above, for continuation of the execution of the program stored in the memory 1. This may be followed immediately by additional address jumps, as described, as a result of the action of the delay circuit 119. No intermediate steps are necessary, for example, for the relocation of data in the memory. Alternatively, this address jump may energize a functional unit 5 upon the appearance of the transfer signal T' of the current operation cycle. The functional unit 5 so energized may again be one that is wired with a delay element 120 to provide for an additional interruption or delay period immediately following the preceding one.

If, during the interval of time determined by the parameters of the delay element 120, the address counter would advance, it is desirable to interrupt the pulsing of the timing circuit 8 by the pulse generator 9 for that length of time. For this purpose, an interrupt circuit 122 precedes a halt input 9.5 of the pulse generator 9. In the simplified diagram of the drawing, this interrupt circuit 122 consists of an OR gate 123 which is connected to the outputs of functional units 5 that are wired with delay elements 120. When one of these delay elements 120 is pulsed as a result of the energization of a functional unit 5 from the program memory 1, it sets a flip-flop 124 which precedes the halt input 9.5. The timing circuit 8 in the address stepping system 2' then can be pulsed only when this flip-flop 125 has been reset by an output from the NAND gate 121.

It will be understood that the specification and examples are illustrative but not limitative of the present invention and that other embodiments within the spirit and scope of the invention will suggest themselves to those skilled in the art.

What is claimed is:

1. In a method of executing an address jump command in a stored program sequential control system for sequencing electrically actuatable functional units, the system having a plurality of jump command generators each capable of generating a jump command, a jump command interrogation circuit, an address counter which is settable to a desired count and is advancable in a step-wise manner from any count, a program memory connected to the output of the address counter and having data stored therein at each address, the data being of a first type for selecting a functional unit or a second type for selecting one jump command generator via the jump command generator interrogation circuit and a timing pulse generator generating stepping signals for effecting the system timing, the improvement comprising the steps of: advancing the address in the address counter a step for each stepping signal generated by the timing generator; sensing the data from the program memory at the address counter address and generating a set signal if the data is of the second type; loading a jump address in the address counter in response to the set signal if the selected jump command generator generates a jump command, wherein the step of loading comprises advancing the address counter to the next address by one of the stepping signals, and transferring the data in the program memory at said next address into the address counter in response to the set signal whereby the data transferred from said next address constitutes the jump address; generating a transfer signal from the timing generator between every two stepping signals; and actuating the selected functional unit in response to the transfer signal if the data from the program memory at the present address is of the first type.

2. The method according to claim 1, wherein the step of actuating the selected functional unit comprises generating a latching signal from the timing generator prior to the transfer signal and inhibiting the actuation of the selected functional unit by the latching signal until a new address is reached if the data at the present address is of the second type.

3. The method of claim 2, further comprising generating another latching signal from the timing generator after the first mentioned latching signal to execute a second jump immediately following an executed jump.

4. The method of claim 2, wherein the step of inhibiting comprises producing an inhibiting signal which is terminated after the setting signal and before the transfer signal and preventing actuation of any functional unit by the inhibiting signal.

5. The method of claim 1, further comprising gating the set signal through to the address counter when a jump command is still present at the selected jump command generator when the address counter is advanced to the next address.

6. In a method of executing an address jump command in a stored program sequential control system for sequencing electrically actuatable functional units, the system having jump command generators presettable when desired to provide a jump command signal, a timing circuit for producing successive stepping signals, an address counter responsive to each stepping signal for advancing its address count one step and responsive to a set signal for resetting the counter to an input address, a program memory responsive to each counter address for providing corresponding data which is of a first type for indicating a functional unit or a second type for indicating a jump command generator, a jump command interrogation circuit for selecting the jump command generator indicated by the second type of data, and an output generator for selecting the functional unit indicated by the first type of data, the improvement comprising the steps of:

(a) generating a set signal when a selected jump command generator provides a jump command signal;
 (b) allowing the address counter to advance one step to the next address in response to a next stepping signal;

(c) loading the data provided by the memory at the next address into the counter in response to the set signal, whereby the data transferred into the counter constitutes a jump address;

(d) generating a transfer signal in the timing circuit between every two stepping signals; and (e) actuating the functional unit selected by the output generator in response to the transfer signal when the data then provided by the memory is of the first type.

7. The method of claim 6, wherein the step of actuating the selected functional unit comprises:

(a) generating a latching signal in the timing generator prior to each transfer signal; and (b) inhibiting the output generator from selecting a functional unit with the latching signal until after loading the jump address into the counter.

8. The method of claim 7, and further comprising:

(a) generating a second latching signal in the timing generator prior to each transfer signal but after the first-mentioned latching signal; and (b) continuing to inhibit the output generator until the next stepping signal following the transfer signal with the second latching signal when the jump address loaded into the counter provides data of the second type from the memory.

9. The method of claim 7, wherein the step of inhibiting the output generator ends before the step of actuating the selected functional unit.

10. The method of claim 6, wherein generating the set signal comprises gating the end of the jump command signal and the beginning of the next stepping signal which advances the address counter.

11. The method of claim 6, 7 or 10, and further comprising:

(a) providing time delay means responsive to actuating a selected functional unit for a time with a delay signal; and (b) inhibiting with the delay signal a selected one of the jump command generators from providing a jump command signal for the time of the delay signal.

12. In a stored program sequential control system for sequencing electrically actuatable functional units including a circuit for executing an address jump command having a plurality of jump command generators each capable of generating a jump command, a jump command interrogation circuit, and an address counter settable to a desired count and advancable in a step-wise manner from any count, a program memory connected to the output of the address counter and having data stored therein at each address, the data being of a first type for selecting a functional unit or a second type for selecting one jump command generator via the jump command interrogation circuit, the improvement comprising: timing pulse generator means for producing stepping signals for advancing the address in the address counter by one step for each stepping signal and a transfer signal between every two stepping signals; means for sensing the data from the program memory at the address counter address and generating a set signal if the data is of the second type; means for loading a jump address in the address counter in response to the set signal if the selected jump command generator generates a jump command, the loading means comprising means for applying one of the stepping signals to the address counter to advance the same to the next address, and means for loading the data in the program memory at said next address into the address counter in response to the set signal whereby the data transferred from said next address constitutes the jump address; and means for actuating the selected functional unit in response to the transfer signal when the data from the program memory at that address is of the first type.

13. The circuit of claim 12, wherein the timing pulse generator means includes means for generating a latching signal prior to the transfer signal and wherein the actuating means comprises means responsive to the latching signal for inhibiting the actuation of the selected functional unit until a new address is reached if the data at the present address is of the second type.

14. The circuit of claim 13, wherein the jump command interrogation circuit generates an acknowledge signal when selected and wherein the means includes two two-stage shift registers whose timing inputs are connected to the latching signal and whose reset inputs are connected in parallel to the set signal through a delay circuit, the data input of the first shift register being connected to the acknowledge signal and its output producing an inhibiting signal, and the data input of the second shift register is connected to the jump command and wherein the means generating the set signal comprises the output of the second shift register.

15. The circuit of claim 13 or 14, wherein the timing means produces at least one additional latching signal for effecting a jump immediately after an executed jump.

16. The circuit of claim 12, wherein the means for producing the set signal includes an AND-gate receptive of the jump command and the address stepping signals and a delay circuit connected to the output of the AND-gate.

17. The circuit of claim 12 or 16, wherein the jump command interrogation circuit generates an acknowledge signal when selected and wherein the means producing the set signal further comprises an inhibiting flip-flop with an overriding set input connected to the acknowledgement signal and at its output defining an inhibiting signal for disenabling the functional units, a reset input thereof being connected to the set signal through a second delay circuit.

18. In a stored program sequential control system for sequencing electrically actuatable functional units, the system having jump command generators presettable when desired to provide a jump command signal, a timing circuit for producing successvie stepping signals, an address counter responsive to each stepping signal for advancing its address count one step and responsive to a set signal for resetting the counter to an input address, a program memory responsive to each counter address for providing corresponding data which is of a first type for indicating a functional unit or a second type for indicating a jump command generator, a jump command interrogation circuit for selecting the jump command generator indicated by the second type of data, and an output generator for selecting the functional unit indicated by the first type of data, the improvement comprising:

(a) means for generating a set signal when a selected jump command generator provides a jump command signal;

(b) means for allowing the address counter to advance one step to the next address in response to a next stepping signal;

(c) means for loading the data provided by the memory at the next address into the counter in response to the set signal, whereby the data transferred into the counter constitutes a jump address;

(d) means for generating a transfer signal in the timing circuit between every two stepping signals; and (e) means for actuating the functional unit selected by the output generator in response to the transfer signal when the data then provided by the memory is of the first type.

19. The circuit of claim 18, and further comprising:

(a) means in the timing circuit for generating a latching signal after each stepping signal and prior to each transfer signal; and (b) inhibit means responsive to the latching signal for inhibiting the output generator from selecting a functional unit until after the jump address is loaded into the counter.

20. The circuit of claim 19, wherein:

(a) the jump command interrogation circuit provides an acknowledge signal when it receives data of the second type for selecting a jump command generator;

(b) the output generator has an inhibit input;

(c) the inhibit means comprises a first two-stage shift register having a reset input, a data input receiving the acknowledge signal, and a timing input receiving each latching signal to shift the acknowledge signal data progressively across the stages of the register both of which are connected to the inhibit input of the output generator to inhibit it; and (d) the means for generating the set signal comprises a second two-stage shift register having a reset input, a data input which receives any jump command signal from a selected jump command generator, and a timing input receiving the latching signal to shift the jump command signal data to the second stage of the register as the set signal; and further comprising:

(e) a delay circuit receiving the set signal and connected to the reset inputs of both shift registers for resetting them after the delay time of the delay circuit.

21. The circuit of claim 19 or 20, and further comprising:

(a) means in the timing circuit for generating a second latching signal after the first-mentioned latching signal and prior to each transfer signal; and (b) means responsive to the second latching signal for keeping the output generator inhibited when the jump address loaded into the counter after the inhibiting of the output generator with the first-mentioned latching signal is data of the second type indicating a jump command generator, whereby successive jumps are speeded.

22. The circuit of claim 18, wherein the means for generating the set signal comprises:

(a) a gate responsive to the end of a jump command signal and the beginning of the next stepping signal for advancing the address counter; and (b) means for delaying the loading response of the means for loading the counter in response to the set signal until the address counter has advanced and the memory provides corresponding data.

23. The circuit of claim 18, 19, or 22, wherein:

(a) the jump command interrogation generator has means for generating an acknowledge signal in response to data of the second type from the memory;

(b) the means for generating the set signal further comprises means for delaying the set signal for a time, and a flip flop responsive to the acknowledge signal for producing an inhibit signal and responsive to the delayed set signal for resetting to end the inhibit signal; and (c) the output generator has means responsive to the inhibit signal for inhibiting its selection of a functional unit.

24. The circuit of claim 18, 19 or 22, and further comprising:

(a) time delay means responsive to the actuating of a selected functional unit for a time with a delay signal; and (b) means responsive to the delay signal for inhibiting a selected one of the jump command generators from providing a jump command signal for the time of the delay signal.

* * * * *